United States Patent [19]

Tyndale

[11] 3,738,559
[45] June 12, 1973

[54] FLASH CUBE ASSEMBLY SYSTEM
[75] Inventor: William B. Tyndale, Waverly, Pa.
[73] Assignee: International Telephone and Telegraph Corporation, Nutley, N.J.
[22] Filed: July 23, 1971
[21] Appl. No.: 165,565

[52] U.S. Cl. ............... 228/1, 29/25.11, 29/25.2, 117/21, 316/20, 316/31, 431/92
[51] Int. Cl. ............................................. B23k 1/06
[58] Field of Search ................... 228/1; 156/73; 431/92, 93, DIG. 3; 29/25.11, 25.13, 25.19, 25.2; 117/16, 21, 33; 316/20, 30, 31

[56] References Cited
UNITED STATES PATENTS

| | | | |
|---|---|---|---|
| 3,587,523 | 6/1971 | Tudor | 117/21 X |
| 3,568,281 | 3/1971 | Barden et al. | 29/25.1 X |
| 3,516,130 | 6/1970 | Bower | 29/25.19 |
| 3,320,715 | 5/1967 | Chauvin | 316/30 X |
| 3,315,071 | 4/1967 | Pfefferle | 431/93 X |
| 3,295,183 | 1/1967 | Orebic | 29/25.19 |
| 3,188,162 | 6/1965 | Anderson et al. | 316/20 |
| 2,794,699 | 6/1957 | Eber | 316/31 X |

Primary Examiner—J. Spencer Overholser
Assistant Examiner—Robert J. Craig
Attorney—C. Cornell Remsen, Jr., Walter J. Baum, Paul W. Hemminger et al.

[57] ABSTRACT

This disclosure relates to a fully automated, electromechanical system designed to apply a plastic coating to individual flash bulbs and then assemble them into fully tested flash cube assemblies, each containing four bulbs. The system essentially is made up os separate subsystems: fluid transfer, coating, and cube module. These subsystems are mounted on a system conveyor chassis which also contains monitoring devices to check conditions of the flash bulbs.

7 Claims, 11 Drawing Figures

Patented June 12, 1973

INVENTOR
WILLIAM B. TYNDALE
BY Vincent B. Ingrassia
AGENT

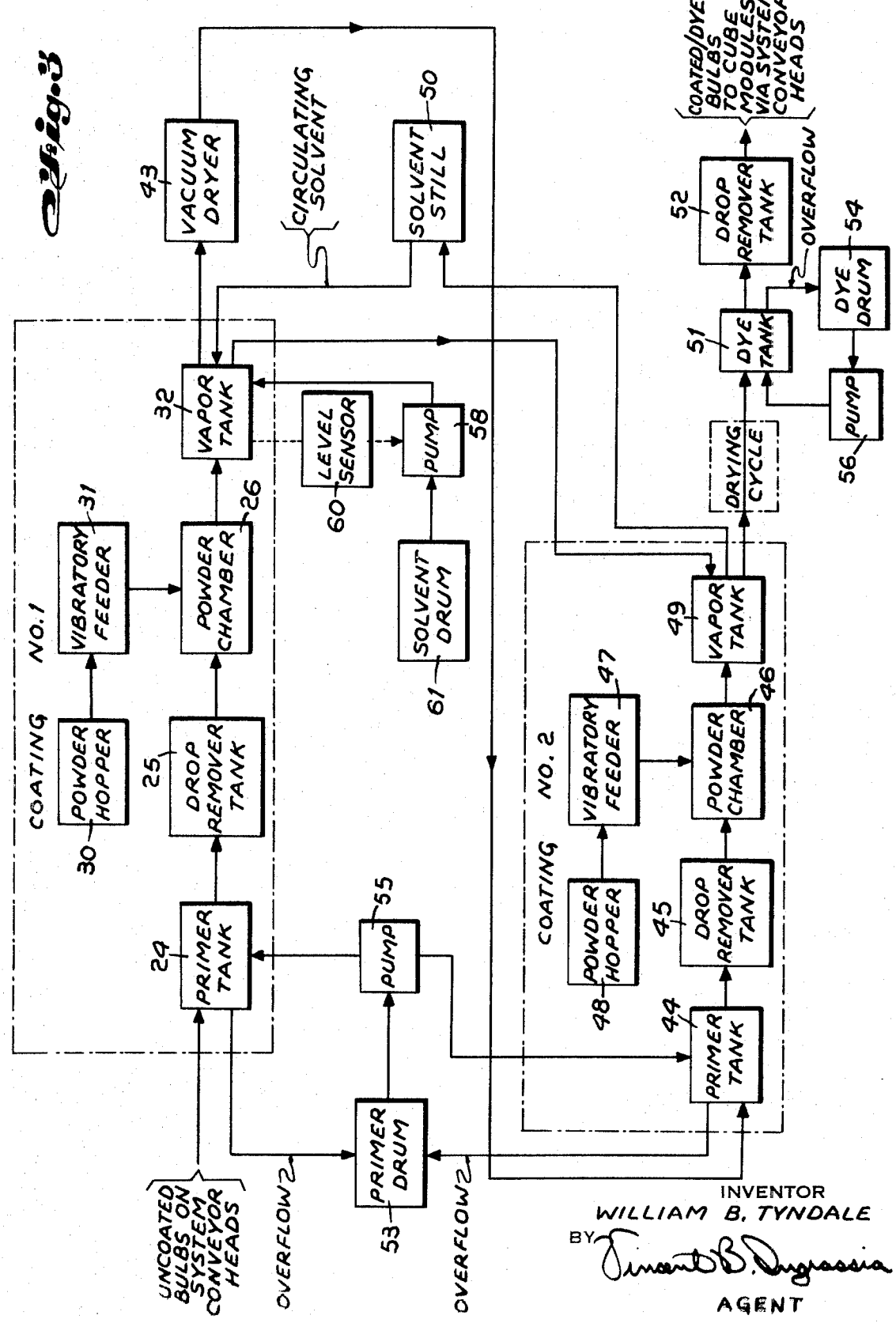

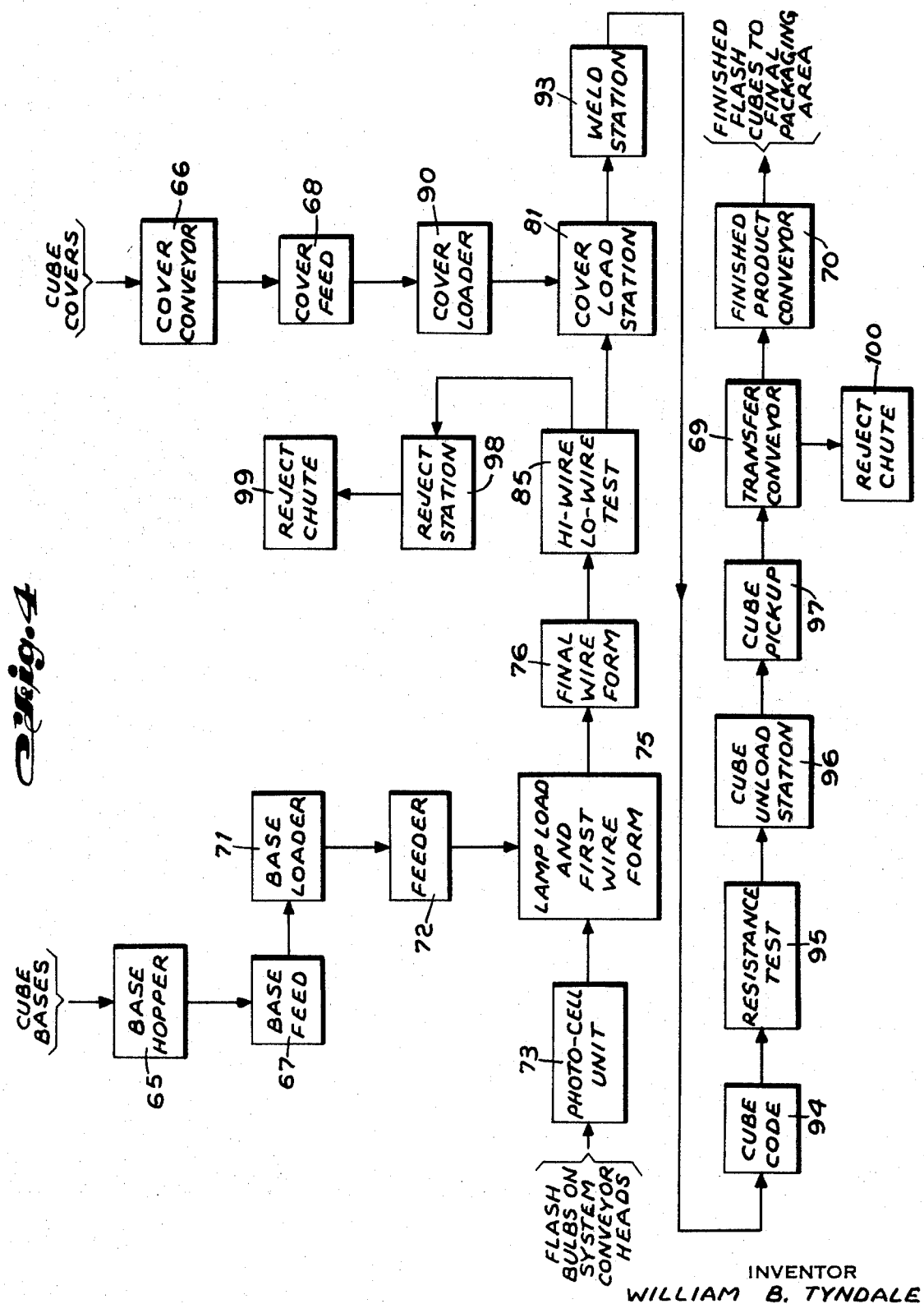

Patented June 12, 1973

INVENTOR
WILLIAM B. TYNDALE
BY
Vincent B. Ingrassia
AGENT

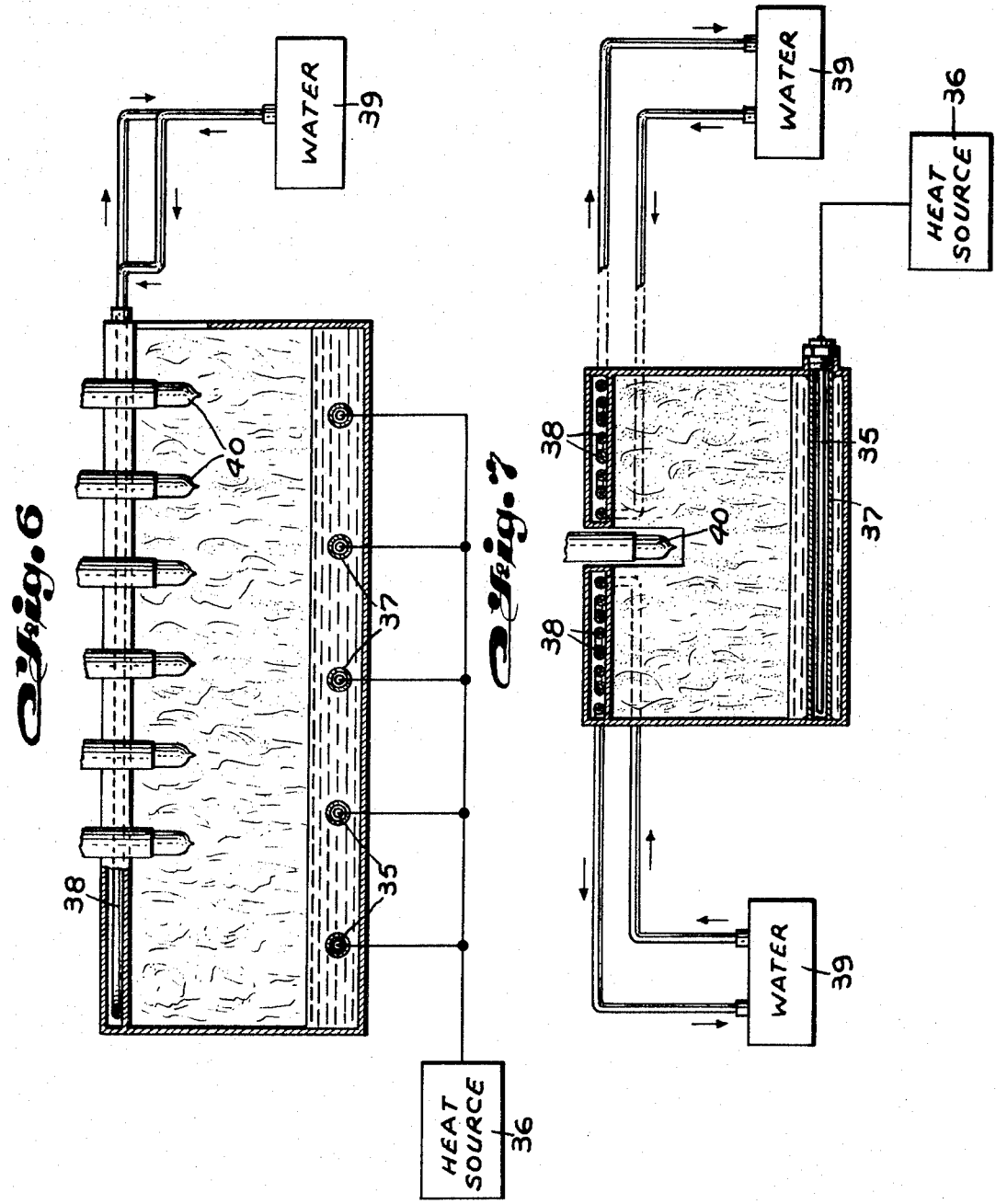

FLASH CUBE ASSEMBLY SYSTEM

BACKGROUND OF THE INVENTION

This invention relates to an apparatus for assembling flash cubes and more particularly to a fully automated electro-mechanical system for applying a plastic coating to individual flash bulbs and assembling them into fully tested flash cube assemblies, each containing four flash bulbs.

In the past, a plastic coating was applied to the individual flash bulbs by dipping them into a liquid plastic and slowly withdrawing them to provide a uniform layer of plastic material on the flash bulb. After withdrawing the bulb, the plastic material is allowed to dry. To achieve the desired thickness of plastic coating, this process would have to be repeated several times, a very time consuming process. If this were to take place in an automatic system a very long conveyor path would have to be provided to allow sufficient time for drying.

SUMMARY OF THE INVENTION

It is an object of the present invention to provide a method and apparatus for applying a plastic coating to a surface.

It is a further object of the present invention to provide an apparatus for applying a plastic coating to individual flash bulbs and then assembling them into fully tested flash cubes.

It is a further object of the present invention that the step of applying said plastic coating is performed at a rapid rate thereby reducing the physical size of said apparatus.

According to a broad aspect of the invention, there is provided an apparatus for applying a plastic coating to a surface comprising means for applying a coating of primer to said surface, means for applying a layer of acetate powder to the primer coated surface, means for heating said powder coated surface to transform the powder to a liquid coating, and means for drying said liquid acetate coating.

According to a further aspect of the present invention, there is provided a method of applying a plastic coating to a surface comprising applying a coating of primer to said surface, applying a layer of acetate powder to the primer coated surface, heating said powder coated surface to transform the powder to a liquid coating and drying said liquid acetate coating.

According to a further aspect of the present invention, there is provided a flash cube assembly system for assembling flash bulbs into tested cube assemblies comprising means for applying a plastic coating to said flash bulbs, means for conveying uncoated flash bulbs to said applying means, and means coupled to said applying means for assembling the coated flash bulb into flash cube assemblies each containing four coated flash bulbs.

The above and other objects of the present invention will be better understood from the following detailed description taken in conjunction with the accompanying drawings in which:

BRIEF DESCRIPTION OF THE DRAWINGS

FIG. 3 is a functional block diagram of the coating subsystem of FIG. 1;

FIG. 4 is a functional block diagram of the cube module subsystem shown in FIG. 1;

FIGS. 6 and 7 are cross-sectional views of the vapor tanks of FIG. 3;

DESCRIPTION OF THE PREFERRED EMBODIMENT

Figure 1:
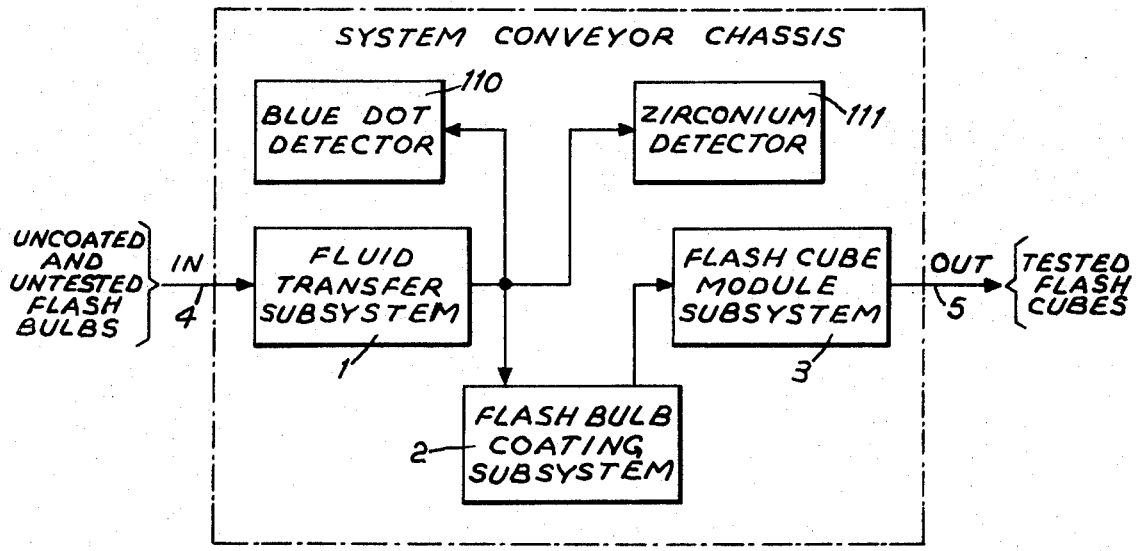
FIG. 1 is a simplified diagram of a flash cube assembly system according to the invention.

The flash cube assembly system shown in FIG. 1 is a fully automated electro-mechanical system which applies a plastic coating to individual flash bulbs and then assembles them into fully tested flash cube assemblies, each containing four flash bulbs. The system essentially is made up of three separate subsystems: a fluid transfer subsystem 1, a flash bulb coating subsystem 2, and a flash cube module subsystem 3. Each of the subsystems will be described in the following paragraphs.

In FIG. 1, uncoated and untested flash bulbs which were manufactured using known methods and apparatus enter at 4, and assembled and tested flash cubes exit at 5.

Figure 2:
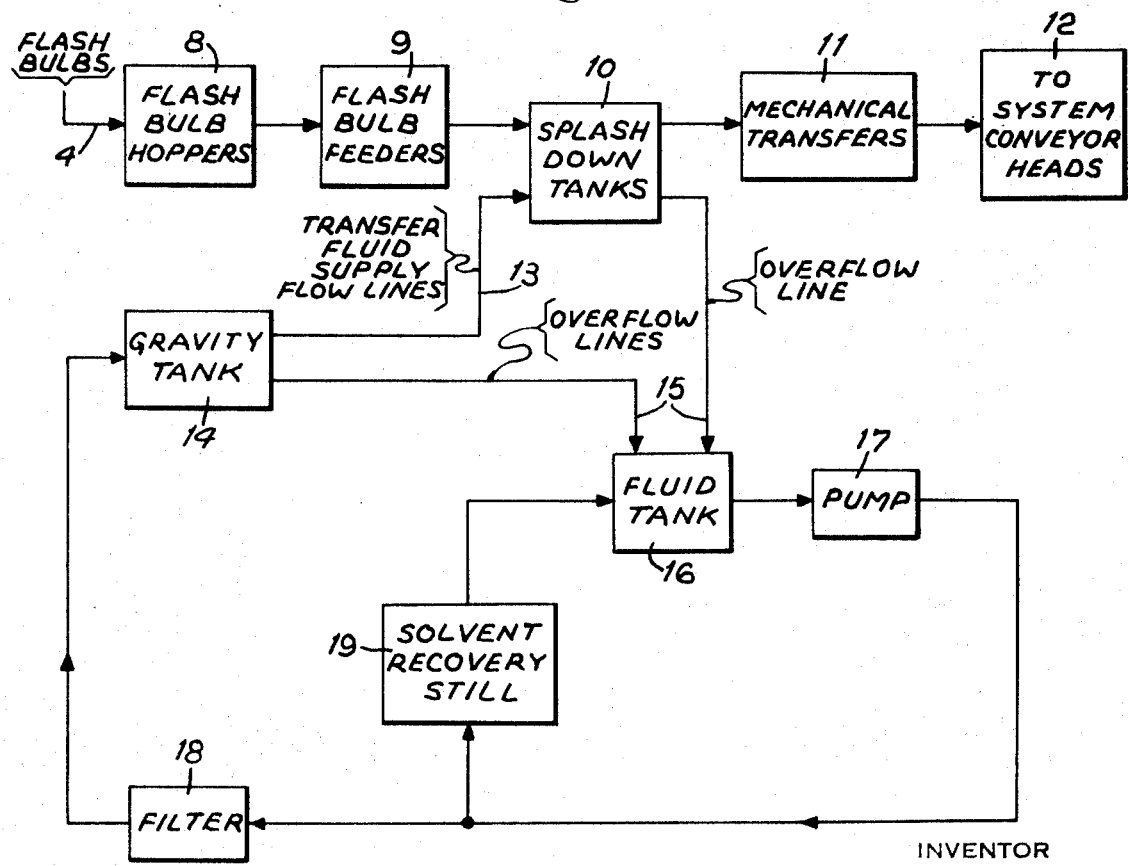
FIG. 2 is a functional block diagram of the fluid transfer subsystem shown in FIG. 1.

The fluid transfer subsystem shown in FIG. 2 of the cube assembly machine is a mechanical transfer system that transfers untested and uncoated flash bulbs from standard bulb hoppers 8 to the system conveyor heads 12. Flash bulbs in bulk quantity are supplied to five vibratory feeders 9, via hoppers 8. The feeders 9 may consist of appropriately shaped pipes for guiding the flashbulbs to five splash down tanks 10. These consist of long narrow containers into which the flash bulbs are dropped and float with their wire leads extended in a downward direction. Each splash down tank is fed by one individual bulb feeder. Photoelectric sensors in the tank control the flow of bulbs by switching the vibratory feeders 9 on or off as required. The bulbs then float through the splash down tanks which contain a flowing transfer fluid, where they are oriented by means of metal guide strips, in a manner which permits mechanical transfer 11 to automatically pick up the flash bulbs and present them to the system conveyor head 12. The mechanical transfer consists of a caterpiller carrier in which each bulb socket contains a spring grip for holding the bulb. The conveyor heads, each of which holds five bulbs, carry the flash bulbs through the coating system 2 and deliver them to the cube module subsystem 3.

Each of the five bulb positions on each of the conveyor heads is fed by a particular one of the five flash bulb feeders 9 which in turn is fed by a particular one of the five flash bulb hoppers 8. That is to say, the first position on the conveyor heads will carry only those bulbs which originate in the first flash bulb hopper and was fed to the first flash bulb feeder. The second position will carry only those bulbs which originate in the second flash bulb hopper and was fed to the second flash bulb feeder, etc.

The transfer fluid flows to the splash down tanks 10 through flow lines 13 from a standard cavity tank 14 located above splash down tanks 10. The gravity tank is a fluid reservoir which maintains constant line pressure by holding the tank fluid constant by means of overflow lines 15 which feed a second fluid tank 16 located beneath splash down tank 10. Fluid tank 16 also receives fluid from splash down tanks 10. Pump 17 transfers the fluid from a fluid tank 16 back to gravity tank 14 through filter 18. A standard electrically heated solvent recovery still 8 is used to remove contaminants from the transfer fluid.

The coating subsystem, shown in FIG. 3, in the cube assembly system is used to coat flash bulbs, conveyed from the fluid transfer subsystem, with two layers of protective acetate coating. This coating is applied to the flash bulbs before they are packaged in to flash bulb cubes to (1) prevent the possible explosion of the flash bulb, damage of the flash cube, and outward flying of particles of glass and plastic during normal use, and (2) to incorporate photographic color correction dye. The coating subsystem consists of two identical coating systems that each apply a coating to each flash bulb. Each system contains a primer tank, drop remover tank, powder chamber, and vapor tank. After receiving two coatings, the flash bulbs are conveyed into a dye tank containing the color correcting dye.

Referring to FIG. 3, flash bulbs on the system conveyor heads are dipped into a tank 24 which contains a slow evaporating liquid primer, for example, butyl alcohol. Following the primer tank 24, the flash bulb tips are passed through a drop remover tank 25 where any excess primer liquid collecting at the tips is wiped off. The drop remover tank 25 may consist of a container held sponge which absorbs the excess primer liquid as each bulb passes over it. The flash bulbs are then dipped into powder in a coating powder chamber 26. Dipping primer-covered flash bulbs into the powder causes the flash bulbs to be completely coated with the powder. Powder chamber 26 consists of a fluidized bed shown in FIG. 5.

Figure 5:
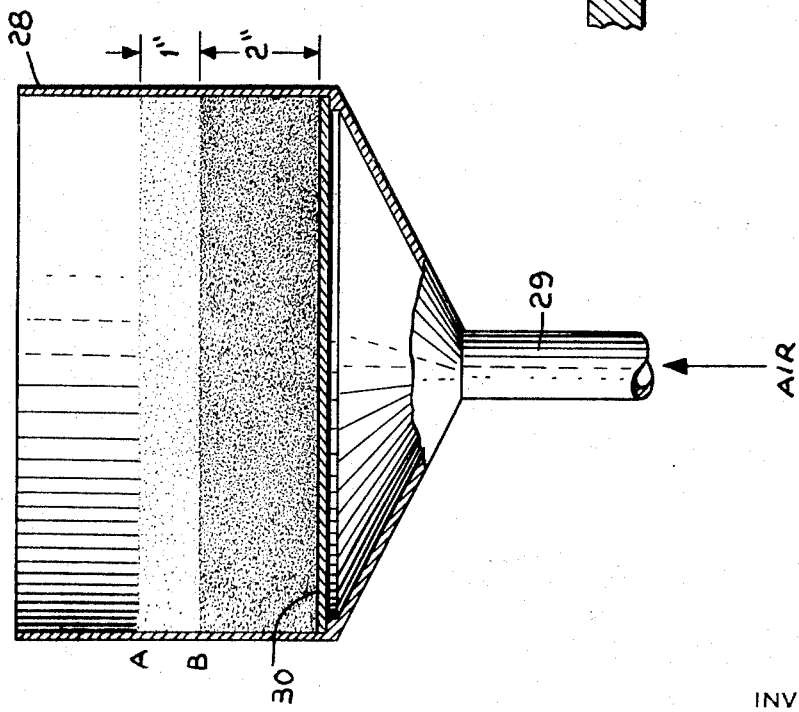
FIG. 5 is a cross-sectional view of the powder chamber of FIG. 3.

Referring to FIG. 5, there is shown a container 28 into which air is forced under pressure through a base pipe 29. Located a few inches above the base of container 28 is a porous membrane 30. Above porous membrane 30 is a layer of cellulose acetate coating powder approximately 2 inches deep, its upper surface reaching level B. As air is forced through porous membrane 30 via air pipe 29, it filters through the layer of coating powder causing the powder to become very light, and raises the level of the powder by approximately an additional one inch to level A. It is below this level that the flash bulbs are dipped so that the entire glass surface receives a coating of powder. It should be clear that if the powder chamber were not a fluidized bed, that is, no air forced through the layer of coating power, the flash bulbs would have to be pressed into the powder causing undue strain on the flash bulb, and the likelihood of a uniform coating of powder of the bulb would be doubtful. In addition, depressions would be left in the powder which might cause succeeding bulbs to be only partially coated. By forcing air through the powder, the powder in effect becomes light reducing strain on the flash bulbs, and the possibility of depressions in the coating powder after a flash bulb has been removed is completely eliminated.

Powder chamber 26 is supplied from standard powder hoppers 30 located above the powder chambers. Standard vibratory powder feeders 31 supply the powder at a desired rate to the powder chambers. The level of powder in the powder chamber can be controlled by controlling the action of the vibratory powder feeders by photoelectric level sensors located within the powder chamber.

After the bulbs are coated with powder, they are conveyed through vapor tank 32 where rising vapor caused by the heating of a solvent, such as methylene chloride, at the bottom of the tank transforms the powder into a liquid coating.

Vapor tank 32 is illustrated in more detail in FIGS. 6 and 7. Heating elements 35 which are coupled to heating source 36 are inserted through pipes 37 located below the level of liquid in the vapor tank. The upper portions 38 of the vapor tank are water cooled via water reservoirs 39. As the vapor rises to dissolve the powder on flash bulb 40 into a liquid coating, it is condensed by water cooled chambers 38 and flows back to the bottom of the tank.

After the first liquid coating, the flash bulbs are passed through a standard vacuum dryer 43. Here the first coating layer is dried and in the process of drying, excess liquid is removed via the vacuum chambers of vacuum dryer 43. The above coating process is repeated by means of a second coating system comprising primer tank 44, drop remover tank 45, powder chamber 46 vibratory feeder 47, powder hopper 48 and vapor tank 49. When the second coating process is completed, the flash bulbs have a protective coating 5 to 7 mils thick.

It should be noted that although the above description relates to the coating of flash bulbs the method could be applied to the coating of other surfaces.

After coating, the flash bulbs are turned 180° and routed completely around the machine on the conveyor head, allowing enough time for the liquid plastic coating to dry. The bulbs are then dipped into an organic dye solution contained in dye tank 51. Excess dye is wiped off the bulb tips in drop remover tank 52 which may consist of a container held sponge which absorbs the excess dye. The dye quickly dries, and the bulbs are now in position for delivery to the modules.

Primer for primer tanks 24 and 44 and dye for dye tank 51 are pumped into the tanks from primer drum 53 and dye drum 54 respectively via pumps 55 and 56 respectively. Leveling of the fluid in the primer tanks and dye in the dye tank, at fixed points, is obtained by returning the overflow through tubing to the respective primer and dye drums.

Solvent for vapor tanks 32 and 49 is pumped into vapor tank 32 by a pump 58 similar to pump 55. The solvent circulates from vapor tank 32 to vapor tank 49, through a standard solvent purification still 59, and back to vapor tank 32. The liquid level in both tanks, controlled by the level sensor 60 in vapor tank 32 is identical as the tanks are located at the same elevation. Solvent still 59 is a standard purification still and removes impurities and powder which may otherwise accumulate in the solvent vapor tanks 42 and 49. Solvent is supplied to pump 58 from solvent drum 61.

After the bulbs have been coated and died, they are ready for processing in the cube module subsystem shown in FIG. 4.

Each module takes 1 bulb per conveyor head, in order, as the heads pass the module loading position. For example, the number 1 module always takes bulbs from the number 1 position on each five-bulb conveyor head.

Cube bases from the standard base hopper assembly 65 are fed through the base feed chute assembly 67 to a base loader 71 which places the base on a turret in proper position for receiving flash bulbs. Feeder 72 determined if a base is in proper position. If no base is present, a warning sounds and the module operation is ceased, requiring manual placement of the missing base and restart of the module operations.

A photocell unit 73 monitors the presence of flash bulbs in the system conveyor head positions associated with the module receiving the flash bulbs. This photocell keeps the module clutch disengaged as long as no flash bulb is present in the head, and, therefore, assures that no flash cube will contain fewer than four flash bulbs. When a bulb is present and the clutch is engaged, the turret is indexed and the bases are rotated into position at lamp load station 75. At this station, a gear-driven rotary pickup removes a flash bulb from the system conveyor head and positions it, correctly oriented, into the base. When the flash bulb leads are inserted through the base, a wire prebend tool bends the flash bulb leads at right angles to the base axis, insuring that the flash bulb is held securely in place during subsequent operations. While at the loading station 75, the head on the turret rotates 4 times until all flash bulbs are positioned and secured in the base. The bulbs and base then proceed to the final wireform station 76 where the final wireform tool crimps the leads completely into the base.

Figure 8:
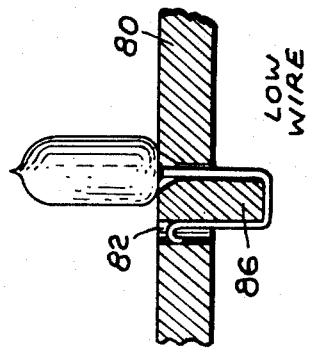
FIG. 8 illustrates a flash bulb inserted into the base of the flash cube.
Figure 9:
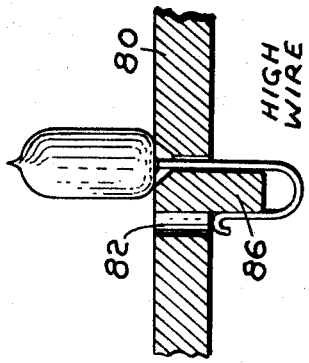
Figure 11:
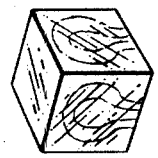
FIG. 11 shows an assembled flash cube.

FIG. 8 illustrates how a lead wire is bent at right angles in the lamp load and first wireform station 75 to insure that the flash bulb is held securely in place. Base 80 has a plurality of tapered lead apertures 81 and apertures 82. A tapered aperture 81 is provided for each lead wire of the four flash bulbs mounted on each base. Position A of the lead wire corresponds to the securing position imparted by station 75. In final wireform station 76, the lead is further bent and crimped into the base as shown by lead position B. At station 85, the flash bulb leads are checked to insure the proper position of the flash bulb wires with relation to the base. FIG. 9 illustrates a faulty high wire lead position in which the lead has not been crimped completely into the base.

Figure 10:
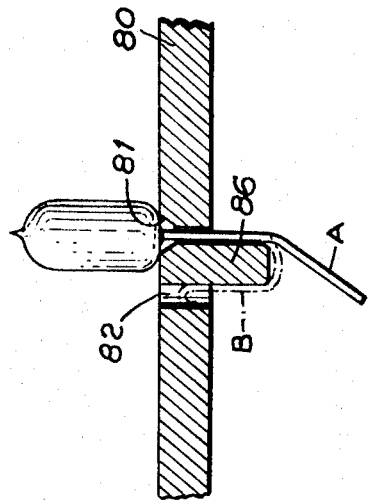
FIGS. 9 and 10 show the flash bulbs inserted into the base having lead wires improperly crimped.

FIG. 10 illustrates a low wire condition in which the flash bulb lead cuts into base projection 86. Both of these conditions can cause improper operation and damage to the flash bulb. If no high wire or low wire condition is detected, at station 85, the base containing the mounted flash bulbs proceeds to cover load station 86. However, if a high wire or low wire condition exists the cube is rejected.

At cover load station 86, the base and flash bulb assembly is provided with reflectors and a cover via cover conveyor 66, cover feed 68 and cover loader 90. After the cube cover is positioned, the cube is completely assembled except for welding.

The cube assembly is then indexed to weld station 93 where a cube cover is ultrasonically welded to the base. After welding, the cube is indexed to cube code station 94 where the date of assembly and the number of the module performing the assembly is coded on the flash cube cover. The flash cubes are then indexed to a resistance test station 95 where each flash bulb in the cube is checked to see if its resistance falls within predetermined limits. The flash cube is then indexed to the cube unload station 96 where a vacuum pick-up 97 places the cube on a standard vertical transfer conveyor 69. The transfer conveyor then carriers the cube to a position where an air stream blows the flash cube from transfer conveyor 69 onto finished produce conveyor 70. The finish product conveyor then carries the flash cubes to a final packaging area.

Bases and flash bulbs that have high wire or low wire defects are not fed a cover and are indexed around the module as just described except that, since no cover is present, the welding, coding, resistance test and unloading operations do not occur. Instead, the base is indexed to reject station 98 where an air stream blows it through a reject chute 99.

Flash cubes that fail the resistance test are loaded onto the transfer conveyor 69 as previously described, however, the resistance tester 95 operates a solenoid via a mechanical memory device which actuates an air stream which blows the defective flash cube from transfer conveyor 69 into a reject chute 100.

Base hoppers 65 are synthron-type vibrating bowls into which a quantity of bases for the cubes are manually loaded. As hoppers 65 vibrate they move the bases into position where a control stream orients them for transfer to the base feeders.

Base feeders 67 and cover feeders 68 supply cube bases and covers to the modules from the base hopper assemblies and cover conveyor 66 located directly above the modules. The flow of bases through the base feeders is controlled by photoelectric detectors located near the base hoppers. When a base feeder is loaded with bases to a specific height, the detector shuts off the electrical system that operates the base hopper. The detector restarts the hopper feed system as the bases are withdrawn by the assembly module.

The flow of cube covers to cover feeder 68 is controlled by photocells and control units. Two lamp sources and photocells, located on the cover feeders, sense the level of covers in the feeders. When the feeders are filled past the level of the top photocell and lamp source the photocell controlled unit disengages a solenoid controlling the air flow that blows the covers off the cover conveyor 66 into cover feeder 68. When the level of covers in cover feeder 68 drops below the lower photocell, the photocell control unit operates the air flow solenoid, and the air stream blows the covers from the cover conveyor 66 into the cover feeder 68 until the upper photocell unit is again activated.

The finished product conveyor 70 consists of a conveyor belt for carrying the finished products, blown onto said conveyor belt from the vertical transfer conveyor 69, to the final packaging area. The conveyor is driven by a three-phase motor through a gear reductor unit.

FIG. 10 shows an assembled flash cube.

The system conveyor chassis main frame provides mounting facilities for the subsystems above described. In addition, the conveyor chassis houses the main drive gear speed controller, all drive gears, couplers, reducers, etc., which determined the operating speeds of the machine; and the system conveyor containing the head assemblies that carry the flash bulbs through the machine.

The main frame also contains blue dot detector 110 and zirconium detector units 111, shown in FIG. 1, which are used to check the flash bulbs for defects before they are assembled into the flash cubes.

The zirconium photocell detector and control unit are located between the fluid transfer subsystem 1 and coating subsystem 2. The photocells sense the zirconium shredding inside the flash bulbs to ascertain whether it is uniformly distributed throughout the flash bulb or clustered tightly at one end or if it is present at all. If an uneven distribution or no zirconium is detected, the photocell control unit activates a solenoid ejector mechanism which ejects the faulty flash bulb from the system conveyor head. A reject lamp is momentarily lighted on control unit when the lamp is rejected.

The blue-dot detector photocell and control unit assembly checks the flash bulb for leakage. The detector senses the blue-dots on the envelope of the flash bulbs. When a pink dot is sensed indicating leakage in the bulb, the unit operates a flash bulb eject solenoid mechanism which ejects the faulty flash bulb from the system conveyor head. In addition, a reject lamp is momentarily lighted on a control unit.

It is to be understood that the foregoing description of specific examples of this invention is made by way of example only and is not to be considered as a limitation on its scope.

I claim:

1. A flash cube assembly system for assembling flash bulbs into tested cube assemblies, said flash bulbs containing a zirconium shredding, comprising:
   means for applying a plastic coating to said flash bulbs;
   means for conveying uncoated flash bulbs to said applying means;
   means coupled to said applying means for assembling the coated flash bulb into flash cube assemblies each containing four coated flash bulbs; and
   a zirconium photocell detector for sensing the zirconium shredding inside said flash bulbs to ascertain whether it is uniformly distributed throughout said flash bulb.

2. A flash cube assembly system according to claim 1 further comprising:
   a blue dot detector photocell for detecting leakage in said flash bulbs.

3. A flash cube assembly system according to claim 1 wherein said conveying means comprises:
   means for storing uncoated and untested flash bulbs;
   at least one liquid filled tank in which the uncoated and untested flash bulbs float;
   means for feeding said uncoated and untested flash bulbs from said storing means to said tank; and
   means for transferring said uncoated and untested bulbs from said tank to said assembly means.

4. A flash cube assembly system according to claim 3 wherein said conveying means further includes:
   a source of liquid;
   means for controlling the liquid level in said tank; and means for removing contaminants in said liquid.

5. A flash cube assembly system according to claim 1 wherein said means for coating comprises:
   means for applying a coating of primer to said uncoated bulbs;
   means for applying a layer of acetate powder to the primer coated bulbs;
   means for heating the powder coated bulbs to transform the powder to a liquid coating;
   means for drying said liquid acetate coating;
   means for applying a coating of photographic dye over said acetate coating; and
   means for drying said dye coated bulb.

6. A flash cube assembly system according to claim 1 wherein said means for assembling comprises:
   a source of cube bases;
   a source of cube covers;
   means for placing the coated flash bulbs on said cube bases;
   means for crimping the lead wires of said coated flash bulbs into said cube base;
   means for applying said cube covers on the bulb loaded cube base; and
   means for ultrasonically welding said cube cover to said cube base.

7. A flash cube assembly system for assembling flash bulbs into fully tested cube assemblies according to claim 6 further comprising:
   means for coding each assembled flash cube; and
   means for measuring resistance of the bulbs in each assembled flash cube.

* * * * *